Oct. 23, 1923.
C. L. KEE
ADVERTISING DEVICE
Filed April 18, 1923
1,471,665
4 Sheets-Sheet 1
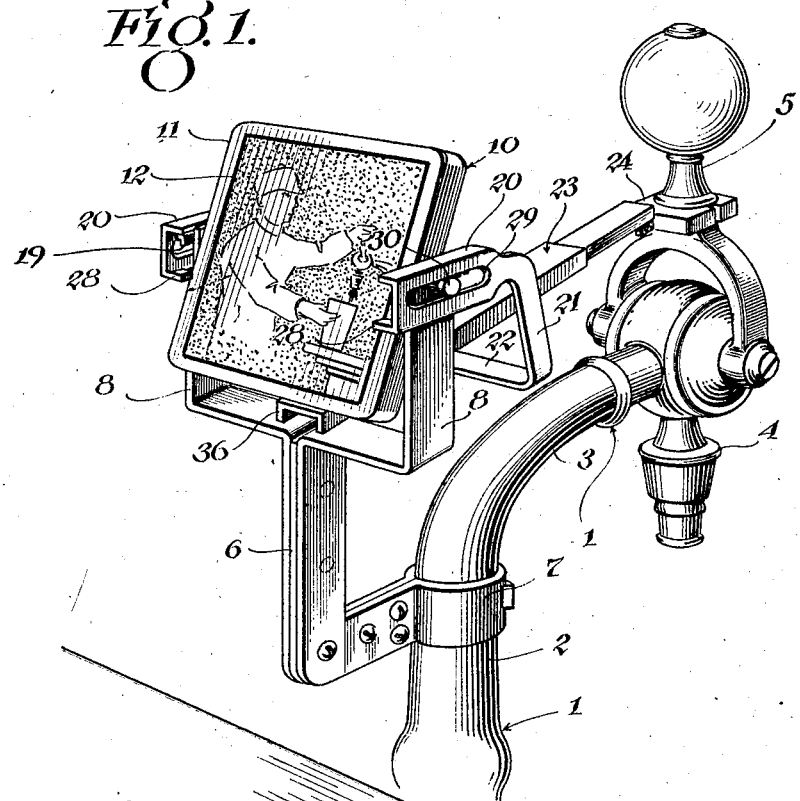
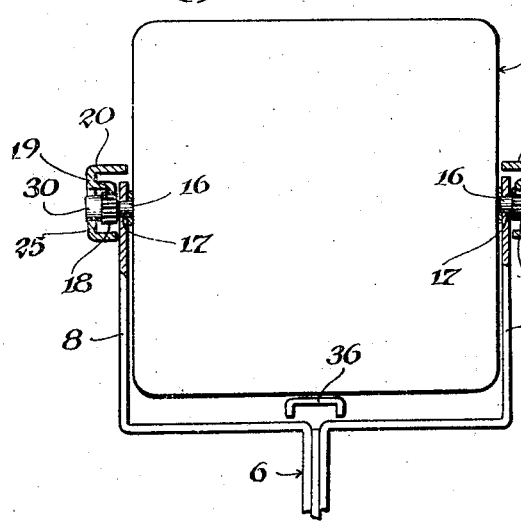
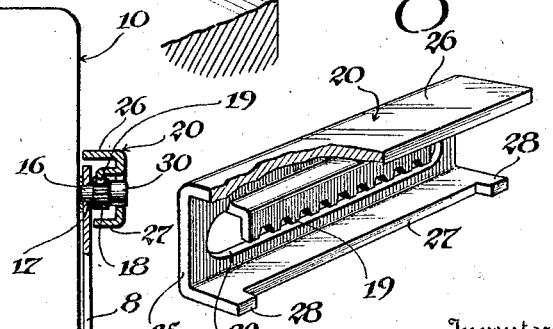
Inventor
Charles L. Kee Oct. 23, 1923.
C. L. KEE
ADVERTISING DEVICE
Filed April 18, 1923          4 Sheets-Sheet 2
1,471,665
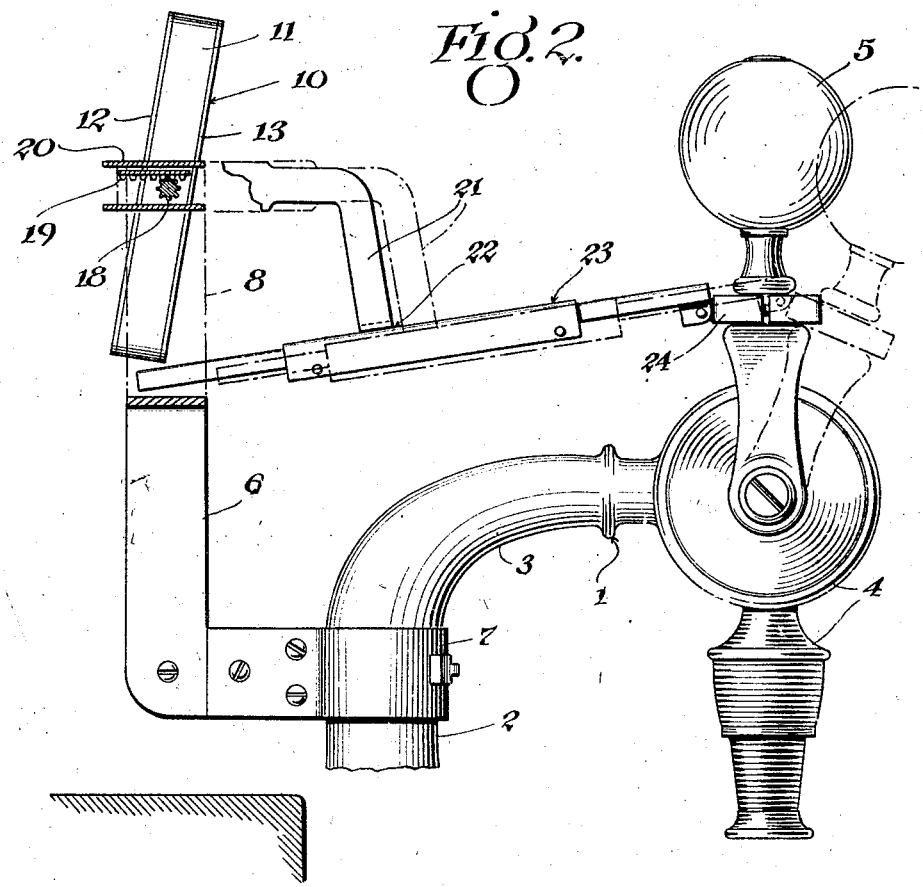
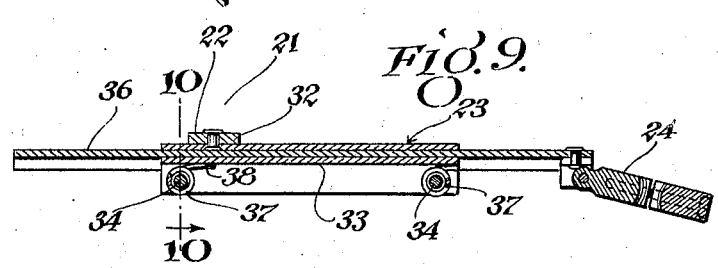
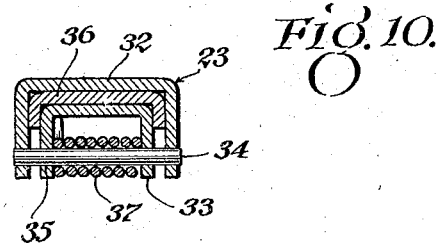
Inventor
Charles L. Kee Oct. 23, 1923. 1,471,665

C. L. KEE

ADVERTISING DEVICE

Filed April 18, 1923 4 Sheets-Sheet 3

Inventor
Charles L. Kee

Oct. 23, 1923.　　　　　　　　　　　　　　　　　　　1,471,665
C. L. KEE
ADVERTISING DEVICE
Filed April 18, 1923　　　　4 Sheets-Sheet 4
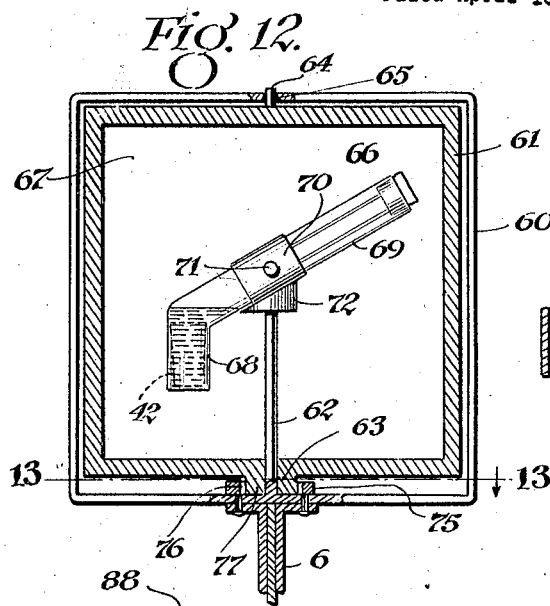
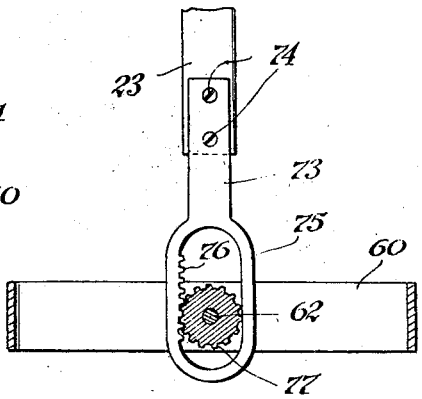
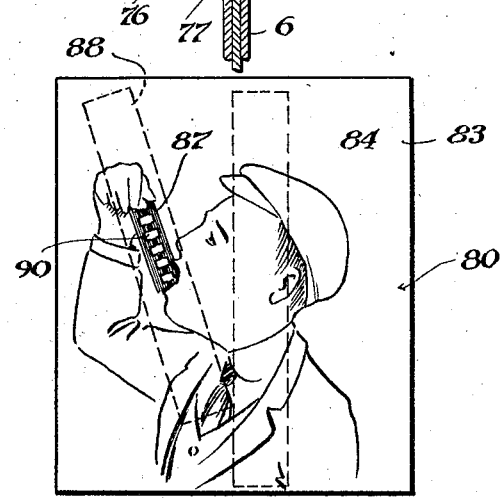
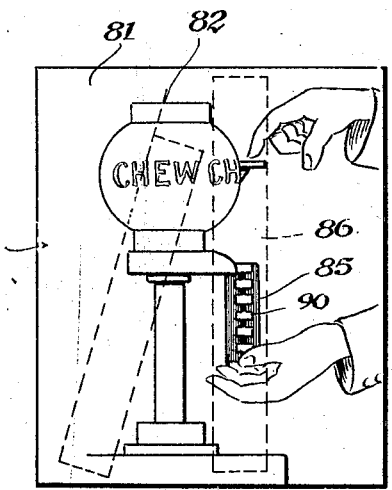
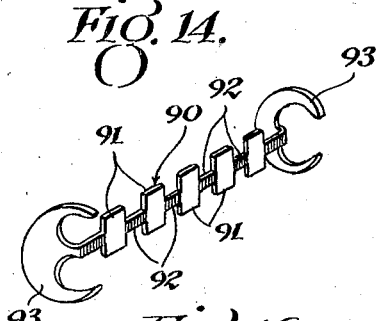
Inventor
Charles L. Kee Patented Oct. 23, 1923.

1,471,665

UNITED STATES PATENT OFFICE.

CHARLES L. KEE, OF PORTSMOUTH, VIRGINIA.

ADVERTISING DEVICE.

Application filed April 18, 1923. Serial No. 632,952.

*To all whom it may concern:*

Be it known that I, CHARLES L. KEE, a citizen of the United States, and a resident of Portsmouth, in the county of Norfolk and State of Virginia, have invented certain new and useful Improvements in Advertising Devices, of which the following is a specification.

This invention relates to advertising devices in the nature of signs or changeable exhibitors which is especially, although not necessarily, adapted for use on and organization with soda fountains or the like, the advertising device constituting the present invention being practically universal in its application.

The object of the invention is to provide an advertising device of this character which serves to strikingly illustrate the successive stages in the use of a commodity in such manner as to attract and hold the attention and interest of even the desultory observer and to impress with a lively and compelling effect upon all who come within its range the advantages and desirable qualities of the subject of the advertisement.

A further object is to provide a device of this character and having the foregoing advantages and which is at the same time of simple and durable construction, attractive and ornamental in appearance and easy and comparatively inexpensive to manufacture, the sign also being so constructed and organized and so mounted and designed as to partake of its movements and actions without requiring attention or manipulation.

In the embodiment of the invention organized with soda fountains, the sign is especially adapted to advertise beverages and successively illustrates and suggests the dispensing of the beverage and the consumption thereof, that is it suggests the successive stages in the use of the beverage in a novel and ingenious manner. Moreover the sign is organized with and is actuated from the operating handle of the draft arm and may be and preferably is supported upon the draft arm. When so located the sign is below the level of the eye and in the normal field of vision and as the patrons of a soda fountain naturally follow the movements of a soda dispenser and especially tend always to observe the actual making of the drinks or drawing of the soda the sign is disposed in a prominent and conspicuous position where it cannot but impress itself upon the attention of the observer. Again it is actuated as often as the operating handle is actuated without impairing the range or ease of operation of the operating handle and this feature has the further advantage of eliminating the expense and trouble of providing special power mechanism.

Of course it is to be understood that the invention is not restricted to the advertising of beverages but may be used in conjunction with various liquid commodities and in fact even solid commodities as will hereinafter appear.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 1 is a perspective view, showing one embodiment of the invention;

Figure 2 is a view, partly in side elevation and partly in section of the embodiment shown in Figure 1;

Figure 6 is a fragmentary view, partly in front elevation and partly in section, showing the manner of mounting and driving the sign;

Figure 7 is a fragmentary detail perspective view of the driving arm construction;

Figure 9 is a detail view of the extensible link, showing the same in central longitudinal vertical section;

Figure 10 is a similar view in transverse vertical section on line 10—10 of Figure 9;

Figure 12 is a view of a modified form of sign construction showing the same partly in vertical section and partly in elevation;

Figure 13 is a view in horizontal section, on line 13—13 of Figure 12;

Figure 14 is a view in elevation, showing the rear face of a modified form of sign;

Figure 15 is a similar view of the front face thereof; and

Figure 16 is a detail perspective view of the shifting solid embodied in the sign shown in Figures 14 and 15.

Figures 3, 4:
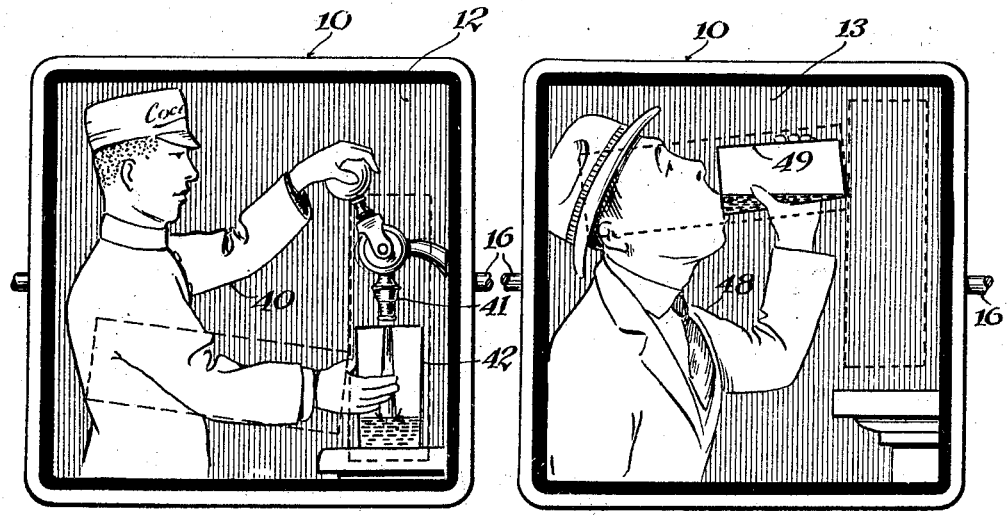
Figure 3 is a detail view in elevation, showing the front face of the sign.
Figure 4 is a similar view of the rear face of the sign.

Referring to the drawings wherein for the sake of illustration is shown the preferred embodiment of the invention and more particularly to Figures 1 and 2, the numeral 1 designates generally the draft arm of a soda fountain with which one embodiment of the present invention is associated and which includes a vertical portion 2 having a curved portion 3 connected to a faucet or nozzle 4 controlled by an operating handle or element 5.

A supporting bracket 6 of resilient metal is provided and is clamped or suitably secured, as at 7, on the vertical portion 2 of the draft arm and at its upper end the bracket 6 is provided with spaced vertical bearing arms 8.

Figures 5, 8:
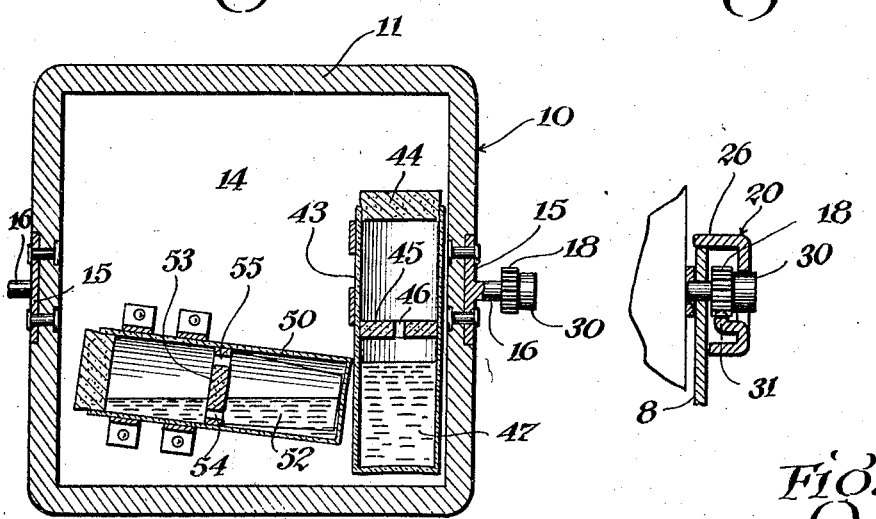
Figure 5 is a detail view in transverse central section showing the internal construction of the sign.
Figure 8 is a sectional view, showing a slightly modified form of driving arm construction.
Figure 11:
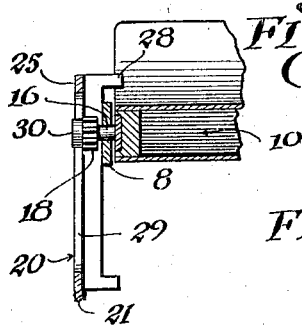
Figure 11 is a fragmentary detail view illustrating the coaction of the stops of the driving arms with the bearing arms.

A sign designated generally at 10 is mounted on the bearing arms 8 and, as shown in Figures 3, 4 and 5, comprises in this embodiment a frame 11 having front and rear opaque faces or walls 12 and 13 respectively, the said frame and walls defining a compartment 14. Opposed portions of the vertical sides of the frame 11 have secured thereto (see Fig. 5) plates 15 carrying trunnions 16 rotatably mounted in bearings 17 provided therefor in the bearing arms 8 as shown in Figure 6 whereby the sign is mounted for turning movement about its horizontal axis on the draft arm 1.

Means is provided for utilizing the movements of the operating handle 5 for turning the sign back and forth about its horizontal axis through approximately 180° and for this purpose pinions 18 are rigidly secured in any approved manner to the portions of the trunnions which project beyond the bearing arms 8. Racks 19 stamped from channel arms 20 integrally formed with the legs 21 of a U-shaped frame 22 mesh with the pinions 18 and the frame 22 is suitably secured to one section of an extensible link 23, the other end of which link is pivotally connected to the clamp 24 embracing and secured to the operating handle 1. Each channel arm 20 includes as well as the body portion 25 from which the rack 19 is stamped upper and lower horizontal flanges 26 and 27 which house and protect the rack and pinion and the lower flange 27 has formed at its ends stop lugs 28 engageable with the adjacent bearing arm 8 for limiting the movement of the channel arm. In the body portion 25 of each channel arm a longitudinal slot 29 is provided and in each such slot a bearing collar 30 is fitted, the bearing collars 30 being secured to the extreme outer edge of the trunnions 16 and having smooth peripheries with which the smooth walls of the slot 29 slidably engage. In lieu of collars the walls of the slots 29 may be directly engaged with the projecting portion of the trunnion.

In Figure 8 a slightly modified form of channel arm construction is shown but differs from that shown in Figure 7 only in that the rack indicated in Figure 8 at 21 is stamped from the body portion of the channel arm so as to engage the underside of the pinions rather than the upper. This modification enables the invention to be adapted to various types of soda fountain faucets.

The extensible link 23 is preferably constructed as shown in Figures 9 and 10 and comprises a section or part made up of an outer channel iron 32 and an inner and smaller channel iron 33. The channel irons 32 and 33 are held against longitudinal displacement by cross pins 34 and these same pins constrain the same to limited movement toward and away from each other, the openings 35 in the flanges of the channel iron 33 through which the pins 34 pass being vertically elongated to permit this latter limited movement. A third channel iron 36 constituting the other part of the extensible link is slidably fitted in between channel irons 32 and 33 and is frictionally engaged by the same by virtue of the action of coil springs 37 arranged on the pins 34 and having extended terminals 38 engaging the channel iron 33, these springs 37 being tensioned and arranged to urge the channel irons 32 and 33 toward each other and into frictional engagement with the channel iron 36. The channel iron 32 is the part of the extensible link 23 which is secured to the frame 22 whereas the channel iron 36 is connected to the clamp 24. In this manner motion transmission means is provided between the operating handle 5 and the sign 10.

The sign 10 has applied to its face 12 representations 40 preferably embodying a figure and including a representation of a faucet indicated at 41 and below the faucet and opening 42, these representations 40 and 41 being designed to suggest the dispensing of a beverage. Within the compartment 14 and behind the opening 42 and faucet 41 a vertically disposed transparent tube 43 is arranged and secured. The opening 42 takes the form of a glass or other vessel or container, so that the portion of the tube 43 which is to be seen through the opening appears as a glass or like drinking vessel. The tube 43 may be made of glass or any suitable material and may be of any shape and cross section. Its ends are closed, one by means of a cork 44 and between its ends and just above the top of the opening 42 a partition 45 divides the tube into two sections which communicate only through a port 46 formed in the partition. In the tube 43 a liquid 47 is arranged and is colored and otherwise constituted to similate a beverage. The partition 45 and its port 46 retard the flow of the liquid from one section to the other of the tube and confine it to stream-like flow. Moreover as the nozzle 41 depicted on the face 12 and the port 46 are vertically and horizontally alined the liquid in flowing from the upper part of the casing to the lower in the position of the sign shown in Figure 3 appears to issue as a stream from the nozzle 41 and this effect is enhanced by providing on the inside of the wall 13 behind the opening 42 a background of a color contrasting sharply with that of the liquid in the tube 43.

The face 13 of the sign has applied thereto representations 48 embodying a figure representing a person in the act of drinking from a glass or drinking vessel constituted by the opening 49 provided in the wall 13. Within the compartment 14 and behind the figure 48 and opening 49 an inclined transparent tube 50 is arranged and is similar in all respects except as to its arrangement with the tube 43. This tube 50 contains a colored liquid 52 simulating a beverage and delineated by a contrasting background on the inside of the wall 12 as in the case of the tube 43 and its liquid and the portion of the tube which appears through the opening 49 enhances the simulation of a drinking glass. A partition designated at 53 is arranged and is secured by friction or otherwise in the tube 50 and corresponds to the partition 45 of the tube 43 except that in lieu of a single central port 46 it is provided with diametrically opposite upper and lower ports 54 and 55 so as to constrain the liquid 52 to flow in the tube when the sign is viewed as shown in Figure 4 as liquid flows from a glass when it is being consumed by a person.

In operation, with the embodiment of the invention above described, whenever the operating handle 5 is swung to the right or in a clockwise direction as viewed in Figures 1 and 2 as it frequently must be to draw a soda or other beverage from the soda fountain, the sign 10 is quickly rotated in a clockwise direction as viewed in Figures 1 and 2 through 180° so as to present to view the face 13 of the sign in lieu of the face 12, since the initial impulse or movement of the handle 5 is transmitted to the sign through the link 23, frame 21 and the racks 19 of its channel arms to the pinions 18 carried by the trunnions of the frame of the sign. It is to be noted at this point that although the stops 28 come into engagement with the bearing arms 8 to limit the movement of the sign nevertheless the freedom and ranges of movement of the operating handle 5 is in no wise impaired for as soon as the forward stops 28 engage the bearing arms to limit the movement of the sign the link 23 is extended to accommodate further movement of the operating handle, the channel iron 36 sliding in between the channel irons 32 and 33 despite the frictional engagement of these parts as this frictional engagement need only be sufficient to overcome the light resistance presented by the sign 10 and associated ports to movement through 180°. Then as the operating handle 5 is swung into a counterclockwise direction as viewed in Figures 1 and 2 the initial impulse or portion of such swinging movement is transmitted to the sign to swing the same in a counterclockwise direction as viewed in Figures 1 and 2 and again present the face 12 to view. This back and forth swinging movement of the sign is frequently repeated during the use of the fountain and produces an effect which will now be described.

When the front face 12 of the sign 10 is presented to view and the sign has been stationary for some little time the colored liquid appears as a beverage contained in a drinking glass and is especially well defined as its color contrasts with that of its background. Moreover in view of the figure 40 and faucet 41 the observer is impressed with the idea that the beverage has just been dispensed even at such time. Then when the sign is quickly shifted through 180° in the manner above described the face 13 of the sign is presented to view and the consumption or drinking of the beverage is strikingly represented as the liquid in the tube 50 appears to pour or flow from the glass defined by the opening 49 into the mouth of the figure embodied in the representations 48, the flow of the liquid being due to the fact that the low end of the inclined tube 50 in the position of the sign shown in Figures 3 and 5 becomes the high end thereof when the sign is shifted through 180° and the face 13 presented to view as shown in Figure 4. The simulation of drinking is enhanced by the retarded flow of the fluid effected by the ported partition 53 as above described. The colored liquid in the tube 53 is also sharply defined by the contrasting background provided therefor. When the soda dispenser shuts off the flow of the carbonated water from the nozzle 4 by shifting the operating handle 5 in a counter clockwise direction, as viewed in Figures 1 and 2 the sign 10 is quickly rotated in a counter-clockwise direction as viewed in Figures 1 and 2 and as hereinabove described in detail to again present the face 12 of the sign to view. At such time the colored liquid in the tube 43 appears to issue as a stream from the nozzle 41 for the lower part of the tube 43 when the sign is positioned as shown in Figure 4 and to which the liquid has flowed with the sign so positioned becomes the upper part of the tube when the sign is shifted to the position shown in Figures 3 and 5 and consequently the liquid flows by gravity through the part of the partition 45 to enhance the simulation of the dispensing action.

In Figures 12 and 13 a modified form of sign is shown and in such form the supporting bracket includes a rectangular frame 60 and the sign 61 is rotatably mounted for turning movement about its central vertical axis by means of a post 62 carried by the frame 60 and extending up through a bearing 63 provided in the lower part of the sign 61, the alined upper part of the frame having a trunnion or pivot 64 coaxial with the post 62 and fitted in a bearing 65 provided in the upper part of the frame 60. The sign 61 is provided as in the other embodiments with a compartment 66 and a wall or face 67 having an opening 68 defining a glass or liquid container and, of course, having applied to its outer surface suitable representations. Within the compartment 66 a transparent tube 69 is arranged and is preferably shaped as shown in Figure 12. The tube is embraced by a band 70 intermediate its ends which carries trunnions 71 rotatably mounted in suitable bearings provided therefor on the front and back walls of the sign. A stationary cam 72 is fixed to the upper end of the post 62 and coacts with the band 70 to rock the tube 69 about its trunnion 71 as the sign 61 is turned. With this form slightly modified means is provided for transmitting the motion from the extensible link 23 to the sign and comprises an arm 73 secured to the link 23 as at 74, and having a yoke 75 sliding in between the lower end of the sign and the frame 60 and provided with a rack 76 formed on one of its bars and meshing with a pinion 77 suitably secured to the sign and axially apertured to accommodate the post 62.

The sign shown in Figures 14 to 16 is adapted to be mounted precisely as the sign 10 of Figures 1 and 2 and when used is substituted in the organization of Figure 2 for the sign 10. The sign of Figures 14 to 16 illustrates the adaptability of the invention for advertising solid commodities such as confections or the like and is designate at 80. In construction the sign 80 is identical with the sign 10 but the front face 81 thereof has a different character of representations 82 applied thereon in order to depict the dispensing of a solid commodity or one stage in the use of such a commodity. Similarly face 83 has applied thereon a figure 84 shown as eating the confections. The face 81 has an opening 85 through which a portion of the transparent tube 86 may be viewed and the face 83 has an opening 87 through which a portion of a transparent tube 88 may be viewed, the tubes 86 and 88 being arranged in the compartment of the sign as in the form of the invention shown in Figures 1 to 11 but these tubes are not provided with any partitions between their ends, which are closed, the bores of the tubes being open and unobstructed. In the tubes 86 and 88 solid bodies 90 simulating confections are slidably arranged, the bodies 90 being freely shiftable in the tubes under the action of gravity. These bodies 90 may take any desired form but are shown as comprising a series of tablet-like portions 91 connected by reduced connecting portions 92 and equipped at their ends with crescent-shaped guides 93 adapted to be slidably engaged with the inner walls of the tubes in which they are mounted. The tablet-like pieces 91 which simulate the confection are suitably colored and on the walls of the sign behind the openings 85 and 87 contrasting backgrounds are provided for these colored tablets 91 so as to sharply delineate them whereas the connecting portions 92 are colored the same as the background so as to be blended therewith and thus effectually camouflaged. In this manner when the face 81 of the sign is presnted to view the tablets in the tube 86 appear to be dropping from the dispensing machine illustrated on the face 81 into the hand shown thereon and when the sign is shifted to present the face 83 similar tablets appear to be dropping into the mouth of the figure 84.

While there are herein shown and described several embodiments of the invention it is to be understood that various changes in form, shape, size and the like may be made without departing from the spirit of the invention or the scope of the subjoined claims.

I claim:

1. In a device of the character described, a sign having a face bearing representations suggestive of the dispensing of a commodity and having a parallel face bearing representation suggestive of the consumption of the commodity, said sign being provided with a compartment located between said parallel faces, a vertically disposed transparent tube arranged in the compartment and containing a body freely shiftable in said tube under the action of gravity and constituted to simulate the commodity represented as being dispensed, the face of the sign bearing the representations suggestive of the dispensing of the commodity being partially cut away to expose to view a portion of the vertically disposed transparent tube, an inclined transparent tube also arranged in the compartment and containing a body freely shiftable therein under the action of gravity and constituted to simulate the commodity, the face of the sign bearing the representations suggestive of the consumption of the commodity being partially cut away to expose to view a portion of the inclined tube, means for mounting the sign for turning movement, and means for turning the sign through approximately 180° so as to successively present to view the faces of the sign.

2. In a device of the character described, a sign having a plurality of faces having respectively depicted thereon representation suggestive of successive stages in the use of a commodity, means for mounting the sign for turning movement, stop means for limiting the movement of the sign, an operating handle movable back and forth, and motion transmission means between the operating handle and the sign including an extensible connecting element.

3. In a device of the character described, a sign having a plurality of faces having respectively depicted thereon representation suggestive of successive stages in the use of a commodity, means for mounting the sign for turning movement, stop means for limiting the movement of the sign, an operating handle movable back and forth, and motion transmission means between the operating handle and the sign including an extensible connecting element comprising interfitting sections frictionally engaged and relatively movable longitudinally.

4. In a sign of the character described, a supporting bracket having bearing arms, a sign, trunnions carried by the sign and mounted on the bearing arms, an operating handle, a motion transmission means between the operating handle and the sign including an extensible link, a U-shaped frame connected thereto, channelled driving arms connected to said frame, said channel driving arms being provided with racks, and pinions fixed to the trunnions and meshing with the racks.

5. In a device of the character described, a sign having a plurality of faces having respectively depicted thereon representations suggestive of stages in the use of a commodity, said sign having a compartment therein defined in part by said faces, a plurality of tubes in the compartment, one for each face, each tube containing a body freely shiftable therein under the action of gravity and constituted to simulate the commodity represented on the face of the sign with which the tube coacts, said compartment having provided therein a background for the shiftable body of each tube, each background being of a contrasting color with respect to the color of its shiftable body, each face being partially cut away to expose a portion of the tube associated therewith and the body arranged therein whereby each shiftable body is adapted to coact with the representations of its face, means for mounting the sign for turning movement, and means for turning the sign so as to successively present to view the faces thereof.

CHARLES L. KEE.